United States Patent
Baek (10) Patent No.: US 9,896,129 B2
(45) Date of Patent: Feb. 20, 2018

(54) DRIVING ASSISTANT SYSTEM OF VEHICLE AND METHOD FOR CONTROLLING THE SAME

(71) Applicant: MANDO CORPORATION, Pyeongtaek-si, Gyeonggi-do (KR)

(72) Inventor: Hyun-Woo Baek, Seongnam-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 64 days.

(21) Appl. No.: 15/072,524

(22) Filed: Mar. 17, 2016

(65) Prior Publication Data
US 2016/0280264 A1 Sep. 29, 2016

(30) Foreign Application Priority Data

Mar. 27, 2015 (KR) .......................... 10-2015-0043170

(51) Int. Cl.
*B62D 15/02* (2006.01)
*G06K 9/00* (2006.01)
(Continued)

(52) U.S. Cl.
CPC ......... *B62D 15/0255* (2013.01); *B60Q 9/008* (2013.01); *G01S 13/862* (2013.01);
(Continued)

(58) Field of Classification Search
CPC ............... B62D 15/0255; G01S 13/867; G01S 2013/9385; G01S 2013/9332; G01S 2013/9378; G06K 9/00818
See application file for complete search history.

(56) References Cited

U.S. PATENT DOCUMENTS 6,560,529 B1 * 5/2003 Janssen .................. G01C 21/28
340/988
8,005,615 B2 * 8/2011 Okabe ................. B60T 8/17558
701/301
(Continued)

FOREIGN PATENT DOCUMENTS

KR            100798815 B1    1/2008
KR     10-2010-0015117 A      2/2010
KR        20140103473 A       8/2014

OTHER PUBLICATIONS

Korean Office Action for corresponding Korean Patent Application No. 10-2015-0043170 dated Apr. 28, 2016, citing the above reference(s).

(Continued)

*Primary Examiner* — Michael J Zanelli
(74) *Attorney, Agent, or Firm* — Hauptman Ham, LLP (57) ABSTRACT

Disclosed herein are a driving assistant system of a vehicle and a driving assistant method. The driving assistant system includes an image acquisition unit that acquires a front image of the vehicle, an obstacle detection unit that detects an obstacle at lateral and rear sides of the vehicle, a determination unit that determines whether a current vehicle is located at a junction road based on the acquired image, and a control unit that automatically changes a lane of the vehicle when it is determined that the current vehicle is located at the junction road and the obstacle is not detected at the lateral or rear side of the vehicle.

9 Claims, 9 Drawing Sheets (51) Int. Cl.
*B60Q 9/00* (2006.01)
*G01S 13/04* (2006.01)
*G01S 15/04* (2006.01)
*G01S 13/86* (2006.01)
*G01S 13/93* (2006.01)

(52) U.S. Cl.
CPC .......... *G01S 13/867* (2013.01); *G01S 13/931* (2013.01); *G06K 9/00805* (2013.01); *G06K 9/00818* (2013.01); *G01S 2013/9332* (2013.01); *G01S 2013/9378* (2013.01); *G01S 2013/9385* (2013.01)

(56) References Cited

U.S. PATENT DOCUMENTS

| | | | |
|---|---|---|---|
| 8,165,776 B2* | 4/2012 | Sugawara | B60W 30/12 340/436 |
| 9,682,725 B2* | 6/2017 | Yamaoka | B62D 15/0255 |
| 2013/0158800 A1* | 6/2013 | Trageser | G08G 1/167 701/41 |
| 2013/0184926 A1* | 7/2013 | Spero | B62D 1/28 701/26 |
| 2015/0210274 A1* | 7/2015 | Clarke | B60W 30/00 382/104 |
| 2016/0214612 A1* | 7/2016 | Kashiba | B60W 10/04 |
| 2017/0113673 A1* | 4/2017 | Kokido | B60W 10/20 |

OTHER PUBLICATIONS

Office Action dated Nov. 17, 2015 regarding Korean Patent application No. 10-2015-0043170, citing the above reference(s).

* cited by examiner

DRIVING ASSISTANT SYSTEM OF VEHICLE AND METHOD FOR CONTROLLING THE SAME

CROSS-REFERENCE TO RELATED APPLICATION

This application claims the benefit of Korean Patent Application No. 2015-0043170, filed on Mar. 27, 2015 in the Korean Intellectual Property Office, the disclosure of which is incorporated herein by reference.

BACKGROUND

1. Field

Embodiments of the present disclosure relate to a driving assistant system of a vehicle and a method for controlling the same, and more particularly, to a driving assistant system of a vehicle that determines whether a current vehicle is located at a junction lane using a camera, a radar sensor, or the like which exists in the vehicle, and assists a driver in safely traveling at a joining point and a method for controlling the same.

2. Description of the Related Art

Generally, a driver may travel by recognizing and determining information on the rear side of a vehicle for the purpose of safe driving in driving the vehicle. For this, a room mirror through which the driver can observe the front and rear sides of the vehicle during traveling while observing the front side of the vehicle is installed inside the vehicle, and side mirrors through which the driver can observe both rear lateral sides are installed at both sides of an outside of the vehicle.

However, on the road, there may be a blind spot in which visible detection by the driver is difficult even using the side mirrors during traveling of the vehicle. For example, there arises a case in which the driver cannot see other vehicles on a road joined with a traveling road of the vehicle at the rear and lateral sides of the vehicle.

In this manner, when a vehicle or an object is present in a blind spot during a lane change while traveling or in parking or stopping, this is highly likely to lead to an accident, so that a rear and side alarm system is used in order to overcome limits of the driver's sight and the side mirrors.

That is, the rear and side alarm system which is used today may detect an obstacle present in the blind spot of the vehicle through a radar sensor and warn a user so as to assist the user in safe driving.

In addition, an adaptive cruise control (ACC) system is a system that enables the speed of a vehicle to be maintained in accordance with outside road conditions even without a driver stepping on a brake or accelerator pedal when a driver sets the speed of the vehicle at a constant speed, and thereby provides convenience to the driver. In recent years, a smart cruise control (SCC) system in which a radar is provided in a vehicle and decelerating or accelerating is possible while maintaining a certain distance from a preceding vehicle when a vehicle in front is used as the preceding vehicle has been developed.

Meanwhile, such an ACC system of the vehicle may control an acceleration control unit, an engine control unit, and a brake control unit of a controlled vehicle using information such as a distance and relative speed between the controlled vehicle and a vehicle in front or an angle with an advancing direction of the controlled vehicle, a predetermined longitudinal speed of the controlled vehicle, and a predetermined acceleration limit value, through a front radar sensor of the vehicle.

In addition, a lane keep assistant system (LKAS) is a system that assists in keeping the lane through the operation of a steering wheel when a driver's unintended lane departure occurs or is expected due to drowsy driving or the like, and when a vehicle of a driver is deviated from its lane in a state in which the driver does not operate a lane change signal, the LKAS generates a warning sound at an early stage and then adds an appropriate steering torque, and thereby may help the driver to keep the lane.

That is, the LKAS is a system that may detect deviation of a vehicle when the vehicle is deviated from its lane and help lateral control of the driver so that the vehicle may follow a target lane at the corresponding speed.

Furthermore, using the ACC system and the LKAS, it is possible to perform a lane change by simultaneously operating longitudinal control and lateral control for following a vehicle in front on a highway.

However, when a junction lane is present at a front side of a vehicle from an image recognized through a camera mounted for lane recognition, an assistant system of a driver is released due to a failure of lane recognition and the behavior of the vehicle may become very dangerous.

SUMMARY

Therefore, it is an aspect of the present disclosure to provide a driving assistant system in a vehicle and a method for controlling the same, which may prevent the occurrence of a case in which an appropriate adaptive cruise control (ACC) and lane change are not performed due to a preceding vehicle to be controlled and lane departure when lanes disappear such as at a joining point, resulting in a dangerous situation.

It is another aspect of the present disclosure to provide a driving assistant system in a vehicle and a method for controlling the same, which may detect a joining point and warn a driver of the danger using a back-sideways alarming system when an obstacle is present back sideways, and thereby may help the driver to safely perform a lane change.

Additional aspects of the disclosure will be set forth in part in the description which follows and, in part, should be obvious from the description, or may be learned by practice of the disclosure.

In accordance with one aspect of the present disclosure, a driving assistant system of a vehicle includes: an image acquisition unit that acquires a front image of the vehicle; an obstacle detection unit that detects an obstacle at lateral and rear sides of the vehicle; a determination unit that determines whether a current vehicle is located at a junction road based on the acquired image; and a control unit that automatically changes a lane of the vehicle when it is determined that the current vehicle is located at the junction road and the obstacle is not detected at the lateral or rear side of the vehicle.

Here, when it is determined that the current vehicle is located at the junction road based on the acquired image and the obstacle is detected at the lateral or rear side of the vehicle, the control unit may release longitudinal and lateral automatic control including accelerating, decelerating, and lane-keeping control of the vehicle.

Also, the driving assistant system may further include a warning unit that warns a driver when it is determined that the current vehicle is located at the junction road based on the acquired image and the obstacle is detected at the lateral or rear side of the vehicle.

Also, the determination unit may determine whether the current vehicle is located at the junction road based on lane recognition information of the acquired image.

Also, the determination unit may recognize a junction road sign board based on the acquired image, and determine that the current vehicle is located at the junction road when recognizing the junction road sign board.

In accordance with another aspect of the present disclosure, a driving assistant method of a vehicle includes: acquiring a front image of the vehicle; detecting an obstacle at lateral and rear sides of the vehicle; determining whether a current vehicle is located at a junction road based on lane recognition information of the acquired image; performing longitudinal and lateral automatic control of the vehicle based on the front image; and automatically changing a lane of the vehicle when it is determined that the current vehicle is located at the junction road based on the lane recognition information and the obstacle is not detected at the lateral or rear side of the vehicle.

Here, the driving assistant method may further include releasing the longitudinal and lateral automatic control of the vehicle when it is determined that the current vehicle is located at the junction road based on the lane recognition information and the obstacle is detected at the lateral or rear side of the vehicle.

Also, the driving assistant method may further include warning a user when it is determined that the current vehicle is located at the junction road based on the lane recognition information and the obstacle is detected at the lateral or rear side of the vehicle.

Also, the longitudinal and lateral automatic control may include accelerating, decelerating, and lane-keeping control of the vehicle.

In accordance with still another aspect of the present disclosure, a driving assistant system of a vehicle includes: a navigation unit that receives road information about a road on which the vehicle is traveling; an obstacle detection unit that detects an obstacle at lateral and rear sides of the vehicle; a determination unit that determines whether a current vehicle is located at a junction road based on the road information; and a control unit that automatically changes a lane of the vehicle when it is determined that the current vehicle is located at the junction road and the obstacle is not detected at the lateral or rear side of the vehicle.

Here, the driving assistant system may further include an image acquisition unit that acquires a front image of the vehicle, wherein the determination unit may re-determine whether the current vehicle is located at the junction road based on the acquired image.

Also, when it is determined that the current vehicle is located at the junction road and the obstacle is detected at the lateral or rear side of the vehicle, the control unit may release longitudinal and lateral automatic control including accelerating, decelerating, and lane-keeping control of the vehicle or warn a driver.

Also, the determination unit may determine whether the current vehicle is located at the junction road based on lane recognition information of the acquired image.

Also, the determination unit may recognize a junction road sign board based on the acquired image, and determine that the current vehicle is located at the junction road when recognizing the junction road sign board.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, preferred embodiments of the present disclosure will be described in detail with reference to the accompanying drawings.

However, the embodiments of the present disclosure can be modified in many different forms and the scope of the present disclosure is not limited to the embodiments described below. In addition, the embodiments of the present disclosure are provided to more completely explain the present disclosure to those skilled in the art. In the specification and the drawings, the same reference numerals will be given to the components having substantially the same functional configurations, and the repetitive description thereof will be omitted, and the shape, size, etc. of the components shown in the drawings may be exaggerated for a clearer explanation.

Figure 1:
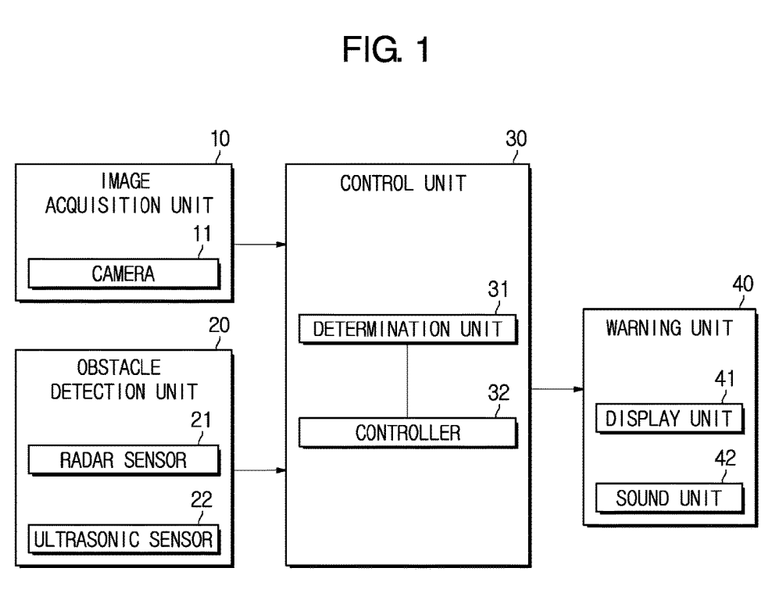
FIG. 1 is a block configuration diagram illustrating a driving assistant system of a vehicle in accordance with one embodiment of the present disclosure.

FIG. 1 is a block configuration diagram illustrating a driving assistant system of a vehicle in accordance with one embodiment of the present disclosure.

Referring to FIG. 1, a driving assistant system 1 of a vehicle includes an image acquisition unit 10, an obstacle detection unit 20, a control unit 30, and a warning unit 40.

The image acquisition unit 10 may include a camera sensor 11 for capturing a front side of the vehicle, capture an outside image of the vehicle, and generate photographic information about the captured outside image.

A camera of more than one channel is typically used, and a complementary metal oxide semiconductor (CMOS) is usually used as an image sensor of the camera. The CMOS image sensor is a semiconductor device that converts an exposed image into an electrical form and transmits the converted image. An image acquired by the camera may be transmitted to the control unit 30.

The image acquisition unit 10 according to the present disclosure may acquire lane information through the image acquired using the camera sensor 11. That is, the image acquisition unit 10 may extract lane information (a lane width, a lateral displacement of a vehicle, a distance to both lanes, a type of a lane, relative reentering angle between a lane and a vehicle, a road curvature, and the like) from the photographic information.

The obstacle detection unit 20 detects an obstacle at rear and lateral sides of the vehicle. Specifically, the obstacle detection unit 20 may employ a radar sensor 21 or an ultrasonic sensor 22.

The radar sensor 21 may output electromagnetic waves and detect the reflection and return of the electromagnetic waves by a moving object, and thereby may determine a distance between an obstacle and a vehicle and a moving speed of the obstacle. Such a radar sensor 21 may be respectively mounted in left and right sides inside a rear bumper of the vehicle, but is not limited thereto. For example, the radar sensor 21 may be installed in a back-mirror of the vehicle, and transmit and receive radar signals.

Such a radar sensor 21 may detect control signals of the entirety of the rear and lateral sides of the vehicle through controller area network (CAN) communication, and transmit the detected control signals to the control unit 30.

In addition, in order to detect an obstacle at the rear and lateral sides of the vehicle, the ultrasonic sensor 22 may be employed.

Figure 3:
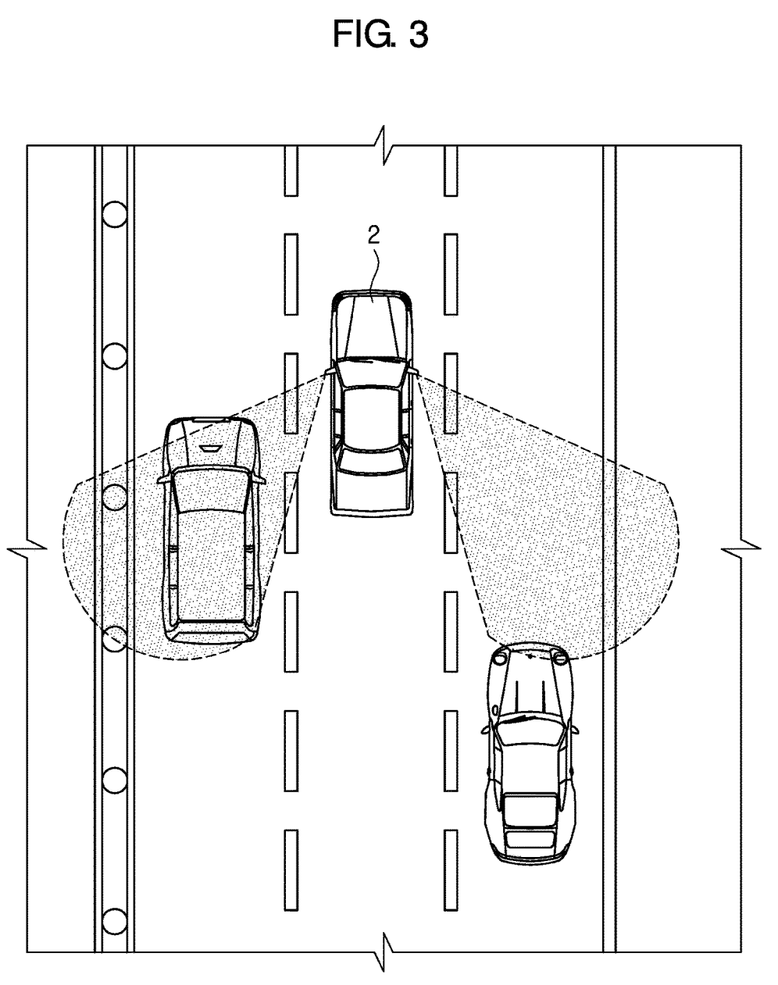
FIG. 3 is a schematic positional diagram of a vehicle in accordance with one embodiment of the present disclosure.
Figure 4:
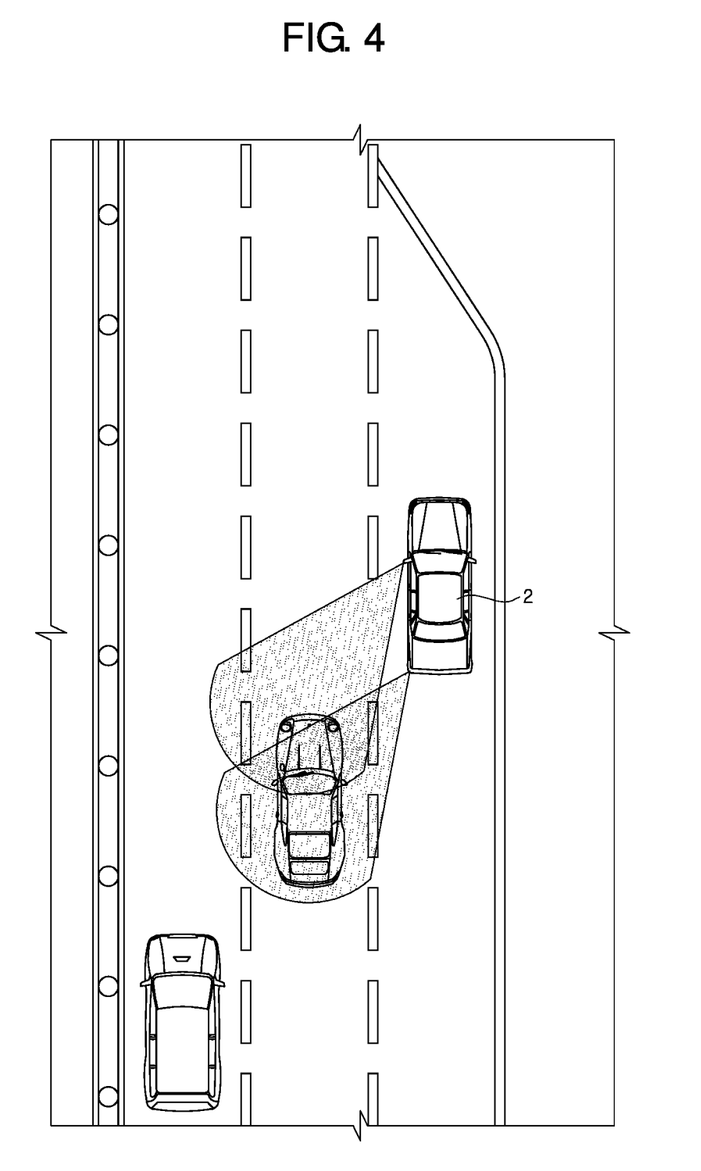
FIG. 4 is a schematic positional diagram of a vehicle in accordance with another embodiment of the present disclosure.
Figure 5:
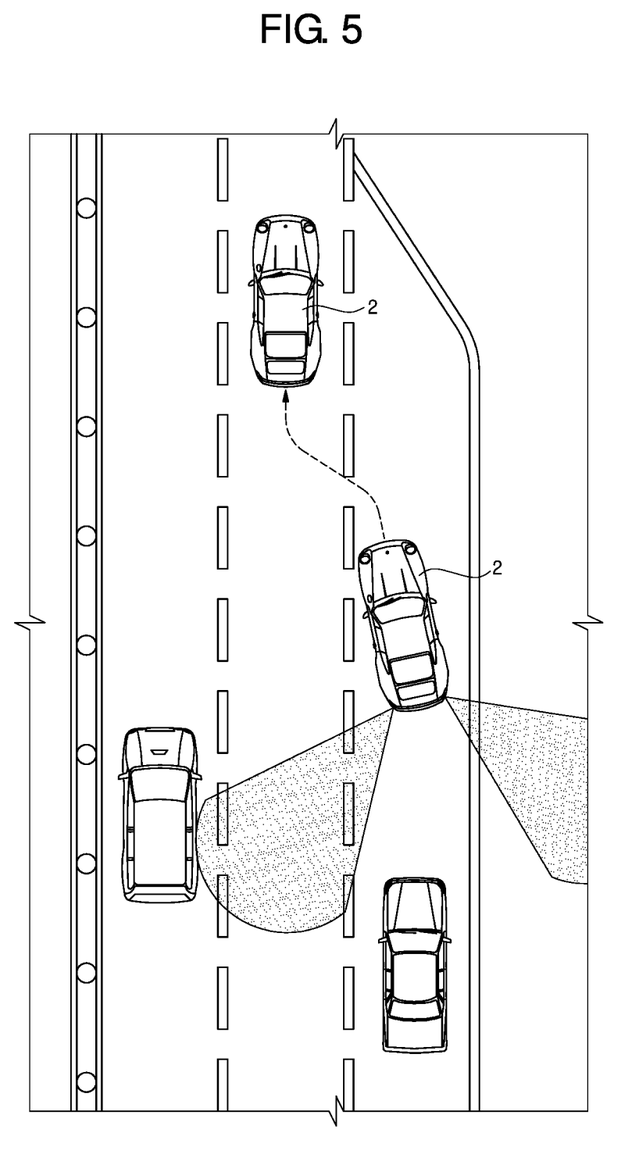
FIG. 5 is a schematic positional diagram of a vehicle in accordance with still another embodiment of the present disclosure.

In this instance, the radar sensor 21 or the ultrasonic sensor 22 may be mounted in the side mirror to detect an obstacle at the rear and lateral sides of the vehicle as illustrated in FIGS. 3 to 5, and mounted below the rear bumper of the vehicle to detect an obstacle at the rear side of the vehicle.

Specifically, the ultrasonic sensor 22 may send a frequency of a predetermined band as an ultrasonic signal and receive a reflected wave by an object, thereby detecting the object. In other words, a time until the ultrasonic signal is reflected and returned back to the ultrasonic sensor 22 after the ultrasonic signal is sent from the ultrasonic sensor 22 and reaches the object may be measured, thereby detecting a distance with the object.

The control unit 30 controls overall operations of the driving assistant system 1 of the vehicle.

Specifically, the control unit 30 may include a main processor and a memory for storing programs and data although they are not illustrated as hardware components that mediate outputting and inputting of data between various components included in the driving assistant system 1 of the vehicle and the control unit 30.

In particular, the memory (not illustrated) may temporarily store a control program and control data for controlling the operation of the driving assistant system 1 of the vehicle, image information acquired from the image acquisition unit 10, a distance from the obstacle detected by the obstacle detection unit 20, vehicle speed information, various control signals output by the main processor (not illustrated), and the like.

The memory may include a non-volatile memory such as a flash memory, a read only memory (ROM), an erasable programmable ROM (EPROM), an electrically erasable programmable ROM (EEPROM), and the like as well as a volatile memory such as a static random access memory (S-RAM), a dynamic RAM (D-RAM), and the like.

Specifically, the non-volatile memory may semi-permanently store the control program and control data for controlling the operation of the driving assistant system 1 of the vehicle. For example, when the obstacle detected by the obstacle detection unit 20 is located at the lateral or rear side of the vehicle, the non-volatile memory may permanently store a safe distance for performing a lane change through longitudinal and lateral automatic control.

In addition, the volatile memory may read the control program and control data from the non-volatile memory and temporarily store the read control program and control data, and temporarily store the image acquired by the image acquisition unit 10, the vehicle speed of the obstacle detected by the obstacle detection unit 20, the distance with the vehicle, and various control signals output by the main processor.

In addition, such a control unit 30 includes a determination unit 31 that determines whether a current vehicle is located at a junction lane that is a lane joining point using the image acquisition unit 10 in a software manner, and a controller 32 that performs lane keeping and lane change control based on junction lane information determined by the determination unit 31, as illustrated in FIG. 1.

First, the determination unit 31 determines whether the current vehicle is located at a junction lane that is a lane joining point from lane information of the image acquired by the image acquisition unit 10. Specifically, in order to determine whether the current vehicle is located at a junction lane that is a lane joining point from the lane information of the image, the determination unit 31 may determine that the current vehicle is located at a junction road when a traveling lane and a lane of the junction road are inclined at a predetermined angle or more.

Next, the controller 32 may acquire obstacle information detected by the obstacle detection unit 20 and perform longitudinal and lateral automatic control of the driving assistant system 1 of the vehicle. Specifically, as to the longitudinal and lateral automatic control of the driving assistant system 1 of the vehicle, lateral control for controlling a lane on which a vehicle is currently traveling to be maintained may be performed using an existing lane keeping assistant system (LKAS).

In addition, longitudinal control in which decelerating or accelerating is possible while maintaining a constant speed of the vehicle may be performed using an adaptive cruise control (ACC) system.

Next, when the determination unit 31 determines that the current vehicle is located at a lane joining point and when an obstacle is detected within a predetermined distance by the obstacle detection unit 20, the controller 32 releases the longitudinal and lateral automatic control of the driving assistant system 1 of the vehicle.

However, in a case in which the determination unit 31 determines that the current vehicle is located at a lane joining point, the controller 32 performs a lane change through the lateral control for the purpose of driver's convenience when the obstacle is not detected within the predetermined distance by the obstacle detection unit 20.

When the longitudinal and lateral automatic control of the driving assistant system 1 of the vehicle is released in accordance with the control signal output by the main processor, the warning unit 40 may warn a user of the release of the longitudinal and lateral automatic control. Such a warning unit 40 may include a display unit 41 that visually displays a warning or a sound unit 42 that audibly outputs a sound in order to warn the user of danger.

When the control unit 30 determines that the current vehicle is located at a junction lane and the obstacle detection unit 20 determines that a vehicle that is an obstacle is located within a safe distance at the lateral and rear sides of the vehicle, the display unit 41 may display a signal for releasing the longitudinal and lateral control of the vehicle without automatically performing the lane change. In addition, the display unit 41 may warn the user of danger by turning on a warning lamp.

However, the present disclosure is not limited to the warning using the display unit 41, and it is possible to audibly warn a user of the release of the longitudinal and lateral control of the vehicle using the sound unit 42.

The control unit 30 transmits the control signal so that the warning unit 40 may warn a driver through CAN communication.

Figure 2:
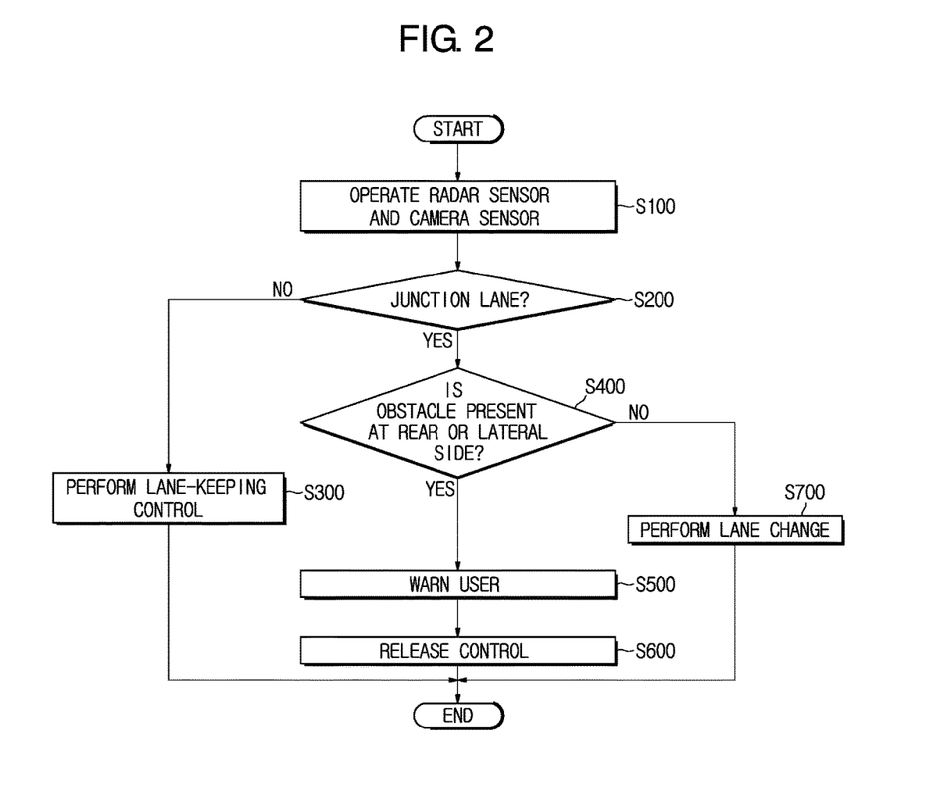
FIG. 2 is a flowchart illustrating a method for controlling a driving assistant system of a vehicle in accordance with one embodiment of the present disclosure.

FIG. 2 is a flowchart illustrating a method for controlling a driving assistant system of a vehicle 2 in accordance with one embodiment of the present disclosure, and FIGS. 3 to 5 are schematic positional diagrams illustrating a driving control method of the vehicle 2 in accordance with different embodiments of the present disclosure.

According to the present disclosure, in operation S100, the driving assistant system 1 of the vehicle may operate the radar sensor 21 for detecting an obstacle and the camera sensor 11 for acquiring a front image of the vehicle. Specifically, the radar sensor 21 of the obstacle detection unit 20 may detect an obstacle located at the lateral and rear sides of the vehicle, and the camera sensor 11 of the image acquisition unit 10 may acquire the front image and extract lane information.

In this instance, in operation S200, the driving assistant system 1 of the vehicle may determine whether a current vehicle is located at a junction lane that is a lane joining point based on the lane information extracted through the acquired image. Specifically, in operation S300, when it is determined that the current vehicle is not located at a lane joining point (NO of operation S200), the driving assistant system 1 of the vehicle may continuously perform lane-keeping control at a lane in which the current vehicle is located. Such lane-keeping control refers to lane-keeping control at a lane on which the vehicle is currently traveling while including lateral control of the vehicle.

As an example, as illustrated in FIG. 3, when it is determined that the current vehicle is not located at a lane joining point from the image acquired by the image acquisition unit 10 such as in a case in which the vehicle 2 travels on a highway (NO of operation S200), the driving assistant system 1 of the vehicle may continuously perform longitudinal and lateral automatic control at the current lane.

However, in operation S400, when the determination unit 31 of the control unit 30 determines that the current vehicle is located at a lane joining point based on the lane information extracted through the acquired image (YES of operation S200), the controller 32 may detect whether a vehicle that is an obstacle is present at the rear and lateral sides of the vehicle.

Specifically, as illustrated in FIG. 4, in operation S500, when a vehicle that is an obstacle is detected (YES of operation S400) by the radar sensor 21 of the vehicle 2, the driving assistant system 1 of the vehicle 2 according to the present disclosure may warn a user of danger. In this instance, the driving assistant system 1 of the vehicle 2 according to the present disclosure may visually warn the user of danger using the display unit 41 or audibly warn the user of danger using the sound unit 42. In addition, in operation S600, the driving assistant system 1 of the vehicle 2 according to the present disclosure may release the longitudinal and lateral automatic control of the vehicle.

However, as illustrated in FIG. 5, in operation S700, when a vehicle that is an obstacle is not detected at the rear and lateral sides using the radar sensor 21 of the vehicle 2 (NO of operation S400), the driving assistant system 1 of the vehicle 2 according to the present disclosure may continue to perform driving assistance by performing a lane change.

Figure 6:
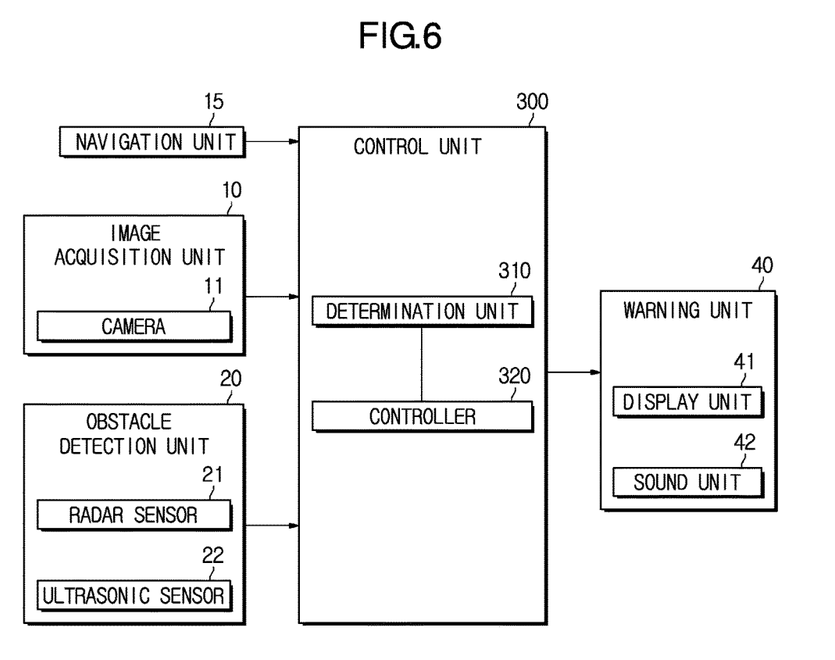
FIG. 6 is a block diagram illustrating a driving assistant system of a vehicle in accordance with another embodiment of the present disclosure.
Figure 7:
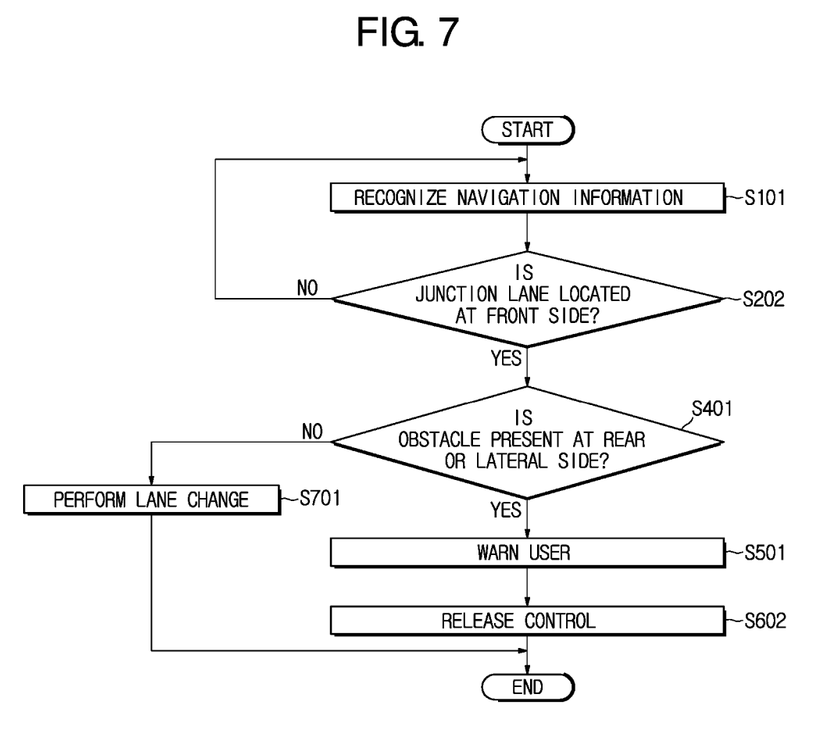
FIG. 7 is a flowchart illustrating a method for controlling a driving assistant system of a vehicle in accordance with another embodiment of the present disclosure.

Next, FIGS. 6 and 7 are respectively a block diagram and a flowchart illustrating a driving assistant system of a vehicle in accordance with other embodiments of the present disclosure.

First, referring to FIG. 6, the driving assistant system 1 of the vehicle includes a navigation unit 15, the image acquisition unit 10, the obstacle detection unit 20, a control unit 300, and the warning unit 40.

In this instance, the image acquisition unit 10, the obstacle detection unit 20, and the warning unit 40 may be operated in the same manner as described in FIG. 1.

As illustrated in FIG. 6, the navigation unit 15 included in the driving assistant system 1 of the vehicle may be connected to a vehicle communication network (NT) to receive various sensor values measured from various sensors included in the vehicle, and transmit a control signal processed inside the navigation unit 15 to the control unit 300.

Specifically, the navigation unit 15 may include a GPS module (not illustrated), and display positional information of a current vehicle or set a route by receiving positional information of the current vehicle. In addition, the navigation unit 15 may display other lane information including junction lane information and speed information of a road on which the vehicle is currently traveling to a user based on the received positional information of the current vehicle.

The control unit 300 may control overall operations of the driving assistant system 1 of the vehicle.

Specifically, the control unit 300 may include a main processor and a memory for storing programs and data although they are not illustrated as hardware components that mediate the output and input of data between various components included in the driving assistant system 1 of the vehicle and the control unit 300.

In particular, the memory (not illustrated) may temporarily store a control program and control data for controlling the operation of the driving assistant system 1 of the vehicle, road information received from the navigation unit 15, image information acquired from the image acquisition unit 10, a distance with an obstacle detected by the obstacle detection unit 20, vehicle speed information, various control signals output by the main processor (not illustrated), and the like.

The memory may include a non-volatile memory such as a flash memory, a ROM, an EPROM, an EEPROM, or the like as well as a volatile memory such as an S-RAM, a D-RAM, or the like.

Specifically, the non-volatile memory may semi-permanently store the control program and control data for controlling the operation of the driving assistant system 1 of the vehicle. For example, when the control unit 300 receives information indicating that a front side of a road on which the current vehicle is traveling is a junction road from the navigation unit 15 and an obstacle detected by the obstacle detection unit 20 is located at the lateral or rear side of the vehicle, the non-volatile memory may permanently store a safe distance for performing a lane change through longitudinal and lateral automatic control.

In addition, the volatile memory may read the control program and control data from the non-volatile memory and temporarily store the read control program and control data, and after the control unit 300 receives the information indicating that the front side of the road on which the current vehicle is traveling is a junction road from the navigation unit 15, the volatile memory may temporarily store the image acquired by the image acquisition unit 10, the vehicle speed of the obstacle detected by the obstacle detection unit 20, the distance with the vehicle, and various control signals output by the main processor.

In addition, such a control unit 300 includes a determination unit 310 that re-determines whether the current vehicle is located at a junction lane based on the image acquired by the image acquisition unit 10 in a software manner after receiving the information indicating that the front side of the road on which the current vehicle is traveling is a junction road from the navigation unit 15, and a controller 320 that performs lane keeping and lane change control based on junction lane information determined by the determination unit 310, as illustrated in FIG. 1.

First, when receiving the information indicating that the front side of the road on which the current vehicle is traveling is a junction road from the navigation unit 15, the determination unit 310 may re-determine whether the current vehicle is located at a junction lane that is a lane joining point from the lane information of the image acquired by the image acquisition unit 10.

Specifically, in order to determine whether the current vehicle is located at a junction lane that is a lane joining point from the lane information of the image, the determination unit 310 may determine that the current vehicle is located at a junction road when a traveling lane and a lane of the junction road are inclined at a predetermined angle or more.

Next, the controller 320 may acquire obstacle information detected by the obstacle detection unit 20 and perform longitudinal and lateral automatic control of the driving assistant system 1 of the vehicle. Specifically, as to the longitudinal and lateral automatic control of the driving assistant system 1 of the vehicle, lateral control for controlling a lane on which the vehicle is currently traveling to be maintained may be performed using an existing LKAS.

In addition, longitudinal control in which decelerating or accelerating is possible while maintaining a constant speed of the vehicle may be performed using an ACC system.

Next, when the determination unit 310 determines that the current vehicle is located at a lane joining point and an obstacle is detected within a predetermined distance by the obstacle detection unit 20, the controller 320 releases the longitudinal and lateral automatic control of the driving assistant system 1 of the vehicle.

However, in a case in which the determination unit 310 determines that the current vehicle is located at a lane joining point, the controller 320 performs a lane change through the lateral control for the purpose of a driver's convenience when an obstacle is not detected within the predetermined distance by the obstacle detection unit 20.

The control unit 300 transmits a control signal so that the warning unit 40 may warn the driver through CAN communication.

Figure 8:
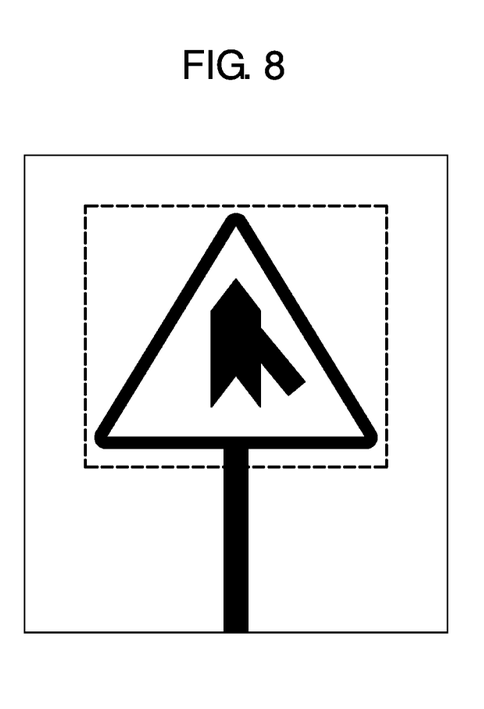
FIG. 8 is a schematic diagram schematically illustrating a camera's recognition of a road sign recognition board in accordance with one embodiment of the present disclosure.

FIGS. 7 and 8 are flowcharts illustrating a method for controlling a driving assistant system of the vehicle 2 in accordance with other embodiments of the present disclosure.

As illustrated in FIG. 7, in operation S101, the driving assistant system 1 of the vehicle may recognize navigation information from the navigation unit. Specifically, the driving assistant system 1 of the vehicle may acquire lane information such as information indicating that a road on which a current vehicle is traveling is a junction road.

In this instance, in operation S201, the driving assistant system 1 of the vehicle may determine whether the current vehicle is located at a junction lane that is a lane joining point based on the acquired lane information.

That is, in operation S401, when the determination unit 310 of the control unit 300 determines that the current vehicle is located at a junction lane that is a lane joining point based on the acquired image (YES of operation S201), the controller 320 may detect whether a vehicle that is an obstacle is present at the rear and lateral sides of the vehicle.

Specifically, as illustrated in FIG. 7, in operation S501, when a vehicle that is an obstacle is detected at the rear and lateral sides of the vehicle by the radar sensor 21 of the vehicle 2 (YES of operation S401), the driving assistant system 1 of the vehicle 2 according to the present disclosure may warn a user of danger. In this instance, in order to warn the user of danger, the driving assistant system 1 of the vehicle 2 according to the present disclosure may visually warn the user of danger using the display unit 41 or audibly warn the user of danger using the sound unit 42. In addition, in operation S601, the driving assistant system 1 of the vehicle 2 according to the present disclosure may release the longitudinal and lateral automatic control of the vehicle.

However, in operation S701, when a vehicle that is an obstacle is not detected at the rear and lateral sides using the radar sensor 21 of the vehicle 2 (NO of operation S401), the driving assistant system 1 of the vehicle 2 according to the present disclosure may continue to safely perform driving assistance by performing a lane change.

Figure 9:
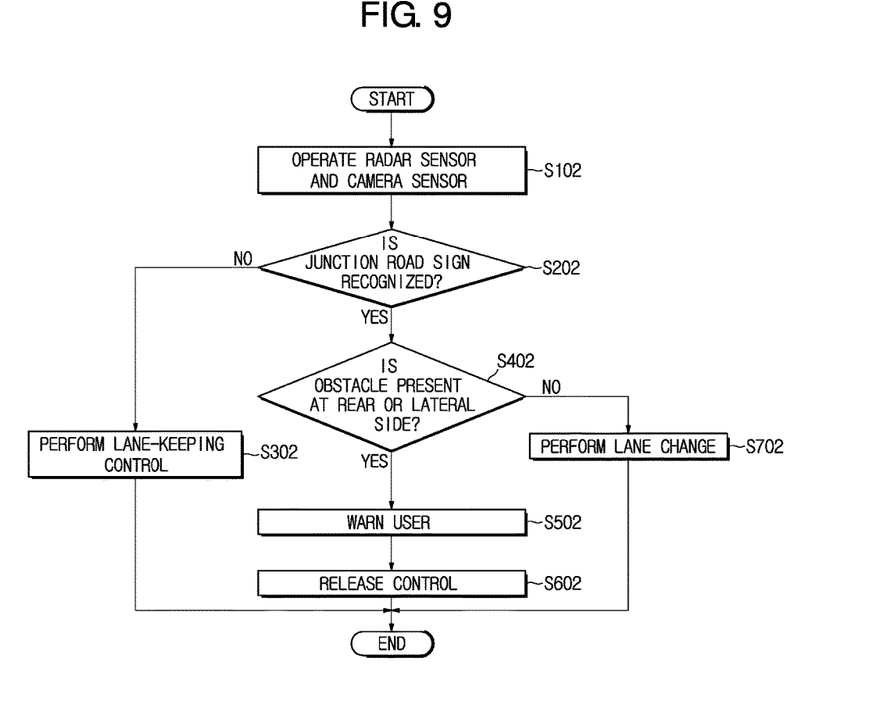
FIG. 9 is a flowchart illustrating a method for controlling a driving assistant system of a vehicle in accordance with still another embodiment of the present disclosure.

However, when a junction road sign shown in FIG. 8 is recognized through the image acquisition unit 10, a method for controlling the driving assistant system of the vehicle 2 in accordance with still another embodiment of the present may be disclosed as illustrated in FIG. 9.

Specifically, as illustrated in FIG. 9, in operation S102, the driving assistant system 1 of the vehicle may operate the radar sensor 21 for detecting an obstacle and the camera sensor for acquiring a front image of the vehicle. In other words, the radar sensor 21 of the obstacle detection unit 20 may detect an obstacle located at the lateral and rear sides of the vehicle, and the camera sensor 11 of the image acquisition unit 10 may acquire the front image and extract lane information.

In this instance, in operation S300, when a junction road sign is not recognized through the acquired image (NO of operation S202), the driving assistant system 1 of the vehicle may continue to perform lane-keeping control on a lane at which the current vehicle is located. Such lane-keeping control refers to lane-keeping control at a lane on which the vehicle is currently traveling while including lateral control of the vehicle.

However, in operation S402, when a junction road sign is recognized through the acquired image (YES of operation S202), the controller 32 may detect whether a vehicle that is an obstacle is present at the rear and lateral sides.

Accordingly, in operation S502, when a vehicle that is an obstacle is detected by the radar sensor 21 of the vehicle 2 (YES of operation S402), the driving assistant system 1 of the vehicle 2 according to the present disclosure may warn a user of danger. In this instance, the driving assistant system 1 of the vehicle 2 may visually warn the user of danger using the display unit 41 or audibly warn the user of danger using the sound unit 42. In addition, in operation S602, the driving assistant system 1 of the vehicle 2 according to the present disclosure may release the longitudinal and lateral automatic control of the vehicle.

In operation S702, when a vehicle that is an obstacle is not detected at the rear and lateral sides by the radar sensor 21 of the vehicle 2 (NO of operation S402), the driving assistant system 1 of the vehicle 2 according to the present disclosure may continue to safely perform driving assistance by performing a lane change.

As described above, according to the embodiments of the present disclosure, it is possible to prevent the occurrence of a case in which an appropriate ACC and lane change are not performed due to a preceding vehicle to be controlled and lane departure when lanes disappear such as in a joining point of a highway, resulting in a dangerous situation.

In addition, it is possible to detect a joining point and warn a driver of the danger using a rear and side alarm system when an obstacle is present at the rear or side, and thereby may help the driver to safely perform a lane change.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:

1. A driving assistant system of a vehicle comprising:
   an image acquisition unit configured to acquire a front image of the vehicle and provide an acquired image;
   an obstacle detection unit configured to detect an obstacle at lateral and rear sides of the vehicle and provide obstacle information;
   a warning unit configured to provide warning signal to a driver
   a determination unit configured to
     receive the acquired image from the image acquisition unit and the obstacle information from the obstacle detection unit,
     determine whether the vehicle is located at a junction road based on the acquired image; and
   a controller configured to,
     when the vehicle is located at the junction road and the obstacle is not detected at the lateral or rear side of the vehicle, automatically change a lane of the vehicle by performing a longitudinal and lateral automatic control including accelerating, decelerating, and lane-keeping control of the vehicle, and
     when the vehicle is located at the junction road and the obstacle is detected at the lateral or rear side of the vehicle, warn the driver through the warning unit and release the longitudinal and lateral automatic control of the vehicle.

2. The driving assistant system according to claim 1, wherein the determination unit is configured to determine whether the vehicle is located at the junction road based on lane recognition information of the acquired image.

3. The driving assistant system according to claim 1, wherein the determination unit is configured to
   recognize a junction road sign board based on the acquired image, and
   determine that the vehicle is located at the junction road when the junction road sign board is recognized.

4. A driving assistant method of a vehicle, the driving assistant method performed by the vehicle comprising an image acquisition unit, an obstacle detection unit, warning unit and control unit, the driving assistant method comprising:
   acquiring a front image of the vehicle from the image acquisition unit;
   detecting an obstacle at lateral and rear sides of the vehicle from the obstacle detection unit;
   determining whether the vehicle is located at a junction road based on lane recognition information of the acquired image; and
   performing a longitudinal and lateral automatic control of the vehicle based on the front image,
   wherein
     when the vehicle is located at the junction road based on the lane recognition information and the obstacle is not detected at the lateral or rear side of the vehicle, the control unit automatically changes a lane of the vehicle by performing a longitudinal and lateral automatic control of the vehicle, and
     when the vehicle is located at the junction road and the obstacle is detected at the lateral or rear side of the vehicle, the control unit warns a driver through the warning unit and releases the longitudinal and lateral automatic control of the vehicle.

5. The driving assistant method according to claim 4, wherein the longitudinal and lateral automatic control includes accelerating, decelerating, and lane-keeping control of the vehicle.

6. A driving assistant system of a vehicle comprising:
   a navigation unit configured to receive road information about a road on which the vehicle is traveling;
   an obstacle detection unit configured to detect an obstacle at lateral and rear sides of the vehicle and provide obstacle information;
   a determination unit configured to
     receive the road information from the navigation unit and the obstacle information from the obstacle detection unit,
     determine whether the vehicle is located at a junction road based on the road information; and
   a controller configured to,
     when the vehicle is located at the junction road and the obstacle is not detected at the lateral or rear side of the vehicle, automatically change a lane of the vehicle by performing a longitudinal and lateral automatic control of the vehicle, and
     when the vehicle is located at the junction road and the obstacle is detected at the lateral or rear side of the vehicle, warn a driver through the warning unit and release the longitudinal and lateral automatic control of the vehicle.

7. The driving assistant system according to claim 6, further comprising:
   an image acquisition unit configured to acquire a front image of the vehicle,
   wherein the determination unit is is configured to determine whether the vehicle is located at the junction road based on an acquired image received from the image acquisition unit.

8. The driving assistant system according to claim 7, wherein the determination unit is configured to determine whether the vehicle is located at the junction road based on lane recognition information of the acquired image.

9. The driving assistant system according to claim 7, wherein the determination unit is configured to
   recognize a junction road sign board based on the acquired image, and
   determine that the vehicle is located at the junction road when the junction road sign board is recognized.

* * * * *